United States Patent [19]

Goel et al.

[11] Patent Number: 4,916,018

[45] Date of Patent: Apr. 10, 1990

[54] OXIRANE PRIMERS FOR SMC ADHESIVES AND BONDING METHOD EMPLOYING SAME

[75] Inventors: Anil B. Goel, Worthington; Joseph G. Holehouse, Columbus, both of Ohio

[73] Assignee: Ashland Oil, Inc., Ashland, Ky.

[21] Appl. No.: 887,499

[22] Filed: Jul. 21, 1986

[51] Int. Cl.$^4$ ............................. B32B 25/38; C09J 5/04
[52] U.S. Cl. ........................................ 428/414; 156/182; 156/315; 156/331.4; 428/302
[58] Field of Search ...................... 156/182, 315, 331.4; 428/302, 414

[56] References Cited

U.S. PATENT DOCUMENTS 4,482,604 11/1984 Sonermeyer et al. ............... 428/414
4,542,070 9/1985 Ohtani et al. ........................ 156/315

*Primary Examiner*—John J. Gallagher
*Attorney, Agent, or Firm*—John F. Jones

[57] ABSTRACT

A process for preparing novel composite structures by priming the surfaces of two or more substrates (such as SMC panels, etc.) with an effective amount of an epoxy resin prior to adhering said surfaces together with an adhesive (such as a polyurethane adhesive) wherein said structures have improved high temperature (about 400° F.) tolerance is described.

18 Claims, No Drawings

OXIRANE PRIMERS FOR SMC ADHESIVES AND BONDING METHOD EMPLOYING SAME

The present invention relates to the use of oxirane containing compounds (epoxy resins) as primers on substrates such as sheet molding compound (SMC) for adhesives such as urethane and epoxy types of adhesives.

The prior art (U.S. Pat. Nos. 3,886,122 and 4,444,976, for instance) describes the use of isocyanate and organo-silicon based primers dissolved in organic solvents such as methylene chloride for adhesives in the adhesion of SMC to itself or to other substrates. Such primers are said to improve the adhesion of the adhesive material to the substrate. For instance, in the bonding of SMC substrates the surfaces of the substrates are often primed with a solvent based isocyanate polymer before the usual urethane adhesive is applied to the substrates. The use of epoxy resins either by themselves or in solution or emulsion as primer for SMC substrates has not previously been disclosed.

Although polyurethane polymers show excellent adhesion properties on substrates such as fiber reinforced plastics, more particularly fiberglass reinforced polyester structures, generally known in the art as sheet molding compounds (SMC), when the surfaces of these substrates are cleaned and treated with known organic primers, they usually provide good adhesion but generally fail to give improved thermal resistance in the adhesive bonds. In some applications in which the adhered SMC parts undergo high temperature bake cycles (about 400° F. for one hour), the urethane adhesives with conventional primers undergo degradation and lose their adhesion under these conditions.

We have discovered that the use of epoxy resins as primers either by themselves or in solution with organic solvents or as emulsions in water, results in improvement in the adhesive performance of the urethane adhesives both cured at moderately elevated temperatures as well as at high temperatures. The epoxy resins may be used as primers either as such or in combination with some low reacting curing agents such as long chain amines having low amine values, latent curing agents such as boron trifluoride amine complexes, and the like. Furthermore, certain epoxy curing agents and catalysts such as lithium chloride, stannous octoate, tetraalkyl ammonium salts, boron triflouride complexes and the like may be included in one of the components of the adhesive formulation in order to ensure the curing of the epoxy film used as the primer for the SMC substrate.

The epoxy resins (polyepoxides) useful in this invention can be monomeric or polymeric, saturated or unsaturated, aliphatic, cycloaliphatic, aromatic or heterocyclic and they may be substituted if desired with other substituents besides the epoxy groups, e.g. hydroxyl groups, ether radicals, halogen atoms, and the like. Typical epoxy components suitable in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula

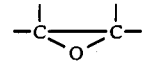

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate, or the dimethyl ester of 6,7,10,11-diepoxy hexadecane-1,16-dicarboxylic acid. Furthermore, there may be used epoxidized mono-, di-, or polyesters and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromonydrin, 3-chloro-1,2-epoxy octane, and the like with either a polyhydric phenol or a polyhydric alcohol.

The substrates used in the process of this invention include SMC (fiber glass reinforced thermoset polyester polymers), urethane polymers (reinforced or unreinforced), thermoplastics such as nylons, epoxy resin composites and the like.

The adhesives used in the process of this invention include polyurethane adhesives, (single or multiple component), epoxy adhesives and hybrid epoxy-polyurethane adhesives and the like. Preferred adhesives are the polyurethane adhesives and most preferred are the multiple component polyurethane adhesives.

The epoxy resin primers of this invention may be applied to the substrates at temperatures in the range of from ambient to 100° C. The amount of primer used on the substrate can be any effective amount but from an economic standpoint the primer can be used in the range of from about 0.001 to 5 mils thickness on the substrate.

The following general procedure was used for preparing adhesive bonds in the following examples:

PREPARING ADHESIVE BONDS

The polyol and the polyisocyanate were mixed in appropriate weight amounts under an inert atmosphere at room temperature. The resulting mixture was applied in the form of a ⅜ inch bead across the substrate surface (SMC laminates) [both primed and unprimed (control)] that measure 12 inches by 4 inches by 100 mils and was wiped clean with a dry rag followed by the application of the epoxy primer. After sprinkling a few 30 mils diameter glass beads on the top of the adhesive to get a final glue line thickness of 30 mils, the other laminate was placed on the top of the first with a one inch overlap. The samples were kept at room temperature under contact pressure until the adhesive had gelled, and then were placed in an oven at 300° F. for postcuring for 30 minutes. Test specimens were cut from these samples into one inch strips.

TEST PROCEDURE

The following tests were carried out by using a set of at least three samples for each type of test:
A. Shear strength test at room temperature
B. Postbaking at 400° F. for an additional one hour and tested shear strength at room temperature.

The invention is further illustrated in the following representative example.

EXAMPLE 1

A polyether polyol having a hydroxy equivalent weight of 382 [poly(propylene oxide)triol] was filled with 17.9% by weight of aluminum hydroxide modified kaolin. The final hydroxy equivalent weight was determined to be 463 and was used as one of the components of a two component urethane adhesive. The other component was formed by filling an isocyanate groups terminated prepolymer based on methylene bis(phenyl isocyanate) and poly (propylene oxide) diol (molecular weight 1,000) having polyurethane groups in the backbone and isocyanate equivalent weight of about 275. The polyisocyanate was filled with about 29% by weight of aluminum hydroxide modified kaolin and the isocyanate equivalent weight of the filed polyisocyanate prepolymer was determined to be 389. The polyol component also contained 0.08% by weight of iron (III) acetonylacetonate and 0.04% by weight of stannous octoate as catalyst. The isocyanate prepolymer and polyol components were mixed in such a ratio that the final isocyanate index was 130% (1.3 NCO per hydroxyl group) and the mixture was applied to a SMC sheet which was primed with a liquid epoxy resin which was applied as a thin film to the surfaces of the substrates just before the adhesive was applied and the results after curing are shown in the following Table. The results of several experiments are given in the Table.

TABLE

| Sample No. | Test Procedure | Lap Shear Strength (psi) | | |
|---|---|---|---|---|
| | | | Primer | |
| | | None | *Epon 828 | **Epon 871 |
| 1 | A | 485 (SB) | 690 (SB) | 370 (SB) |
| 2 | A | 490 (DL) | 385 (SB) | 330 (SB) |
| 3 | B | 495 (AF) | 480 (DL) | 515 (DL) |
| 4 | B | 470 (AF) | 365 (SB) | 410 (SB) |

*Epon 828 is a liquid diglycidly ether of Bisphenol-A (Epoxy equivalent weight of 180-195 from Shell Chemical Company)
**Epon 871 is a diglycidyl ester of linoleic acid dimer (Epoxy equivalent weight of 390-470 from Shell Chemical Company)
SB Substrate broke
DL Substrate delaminated
AF Adhesive failure It is apparent from these tests that the unprimed test samples had poor adhesion compared with the primed samples when subjected to the 400° F. post baking conditions.

We claim:

1. In the process for adhering the surfaces of two or more fiber reinforced plastic substrate materials to one another to form a composite structure by means of an adhesive, the improvement comprising the steps of (1) priming the surfaces with an epoxy resin, (2) applying to the primed surfaces of polyurethane adhesive, and (3) contacting the resulting surfaces to effect lamination.

2. The process of claim 1 wherein the substrate materials are sheet molding compound laminates.

3. The process of claim 2 wherein the adhesive is a multiple component polyurethane adhesive.

4. The process of claim 3 wherein the epoxy resin is a compound containing more than one group of the formula

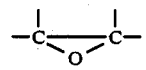

5. The process of claim 4 wherein the polyurethane is a two component adhesive.

6. The process of claim 5 wherein the epoxy resin is present in from about 0.001 to 5 mils thickness on said surfaces.

7. The process of claim 6 wherein the priming is done at a temperature in the range of from about ambient to about 100° C.

8. The process of claim 7 wherein the epoxy resin is a diglycidyl ether of Bisphenol-A.

9. The process of claim 7 wherein the epoxy resin is a diglycidyl ether of linoleic acid dimer.

10. The structure produced by the method of claim 1.

11. The structure of claim 10 wherein the substrate materials are sheet molding compound laminates.

12. The structure of claim 11 wherein the epoxy resin is a compound containing more than one group of the formula

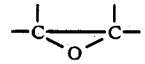

13. The structure of claim 12 wherein the polyurethane adhesive is a multicomponent adhesive.

14. The structure of claim 13 wherein the polyurethane is a two component adhesive.

15. The structure of claim 14 wherein the epoxy resin is present in from about 0.001 to 5 mils thickness on said surfaces.

16. The structure of claim 15 wherein the priming is done at a temperature in the range of from about ambient to about 100° C.

17. The structure of claim 16 wherein the epoxy resin is a diglycidyl ether of Bisphenol-A.

18. The structure of claim 16 wherein the epoxy resin is a diglycidyl ether of linoleic acid dimer.

* * * * *